United States Patent [19]

Wellner

[11] Patent Number: 4,935,486

[45] Date of Patent: Jun. 19, 1990

[54] PROCESS FOR THE PRODUCTION OF MODIFIED POLYISOCYANATES, THE POLYISOCYANATES OBTAINABLE BY THIS PROCESS AND THEIR USE AS BINDERS OR AS A BINDER COMPONENT

[75] Inventor: Wolfgang Wellner, Bergisch Gladbach, Fed. Rep. of Germany

[73] Assignee: Bayer Aktiengesellschaft, Bayerwerk, Fed. Rep. of Germany

[21] Appl. No.: 343,328

[22] Filed: Apr. 26, 1989

[30] Foreign Application Priority Data

May 5, 1988 [DE] Fed. Rep. of Germany ....... 3815237

[51] Int. Cl.$^5$ ............................................. C08G 18/70
[52] U.S. Cl. ........................................ 528/67; 528/60; 528/65; 528/66; 528/76; 528/83; 528/85
[58] Field of Search ................. 528/67, 60, 65, 66, 528/76, 83, 85

[56] References Cited

U.S. PATENT DOCUMENTS

| | | | |
|---|---|---|---|
| 3,023,228 | 2/1962 | Wagner et al. | 260/471 |
| 3,183,112 | 5/1965 | Gemassmer | 106/316 |
| 3,394,111 | 7/1968 | Liebsch | 260/77.5 |
| 3,428,611 | 2/1969 | Brotherton et al. | 260/75 |
| 3,992,316 | 11/1976 | Pedain et al. | 252/182 |

FOREIGN PATENT DOCUMENTS 1244416 9/1971 United Kingdom .
1458564 12/1976 United Kingdom .

OTHER PUBLICATIONS

Chemical Abstracts, Band 94, Nr, 11, Jun. 1981.

*Primary Examiner*—Maurice J. Welsh
*Attorney, Agent, or Firm*—Joseph C. Gil; Thomas W. Roy

[57] ABSTRACT

The present invention is directed to a process for the production of urethane- or isocyanurate-modified polyisocyanates based on a starting diisocyanate selected from (i) 2,4-diisocyanatotoluene or mixtures thereof with up to about 35%, based on the mixture, of 2,6-diisocyanatotoluene, (ii) mixtures of the diisocyanates mentioned under (i) with up to 80 NCO equivalent %, based on the mixture, of 1,6-diisocyanatohexane and (iii) 1-isocyanato-3,3,5-trimethyl-5-isocyanatomethyl cyclohexane by reacting the starting diisocyanate with substoichiometric quantities of polyhydric alcohols or trimerizing a portion of the isocyanate groups of the starting diisocyanate, removing sufficient excess, unreacted starting diisocyanate to obtain modified polyisocyanates containing at most 3% by weight, based on solids, of monomeric starting diisocyanate, characterized in that, the content of starting diisocyanate is further reduced by adding at least 10 mol-% water, based on the content of unreacted 2,4-diisocyanatotoluene or 1-isocyanato-3,3,5-trimethyl-5-isocyanatomethyl cyclohexane present, to the modified polyisocyanates.

The present invention is also directed to the low-monomer polyisocyanates obtained by this process and their use as the binder component in one-component or two-component polyurethane lacquers.

5 Claims, No Drawings

PROCESS FOR THE PRODUCTION OF MODIFIED POLYISOCYANATES, THE POLYISOCYANATES OBTAINABLE BY THIS PROCESS AND THEIR USE AS BINDERS OR AS A BINDER COMPONENT

BACKGROUND OF THE INVENTION

1. Field of the Invention

This invention relates to a new process for the production of low-monomer urethane- or isocyanurate-modified polyisocyanates based on 2,4-diisocyanatotoluene or 1-isocyanato-3,3,5-trimethyl-5-isocyanatomethyl cyclohexane by the selective reduction of the content of these monomers in the modified polyisocyanates by the addition of water.

2. Description of the Prior Art

It is known (DE-OS No. 2,414,413 and DE-OS No. 2,414,391) that the content of monomeric starting diisocyanate in isocyanurate- or urethane-modified polyisocyanates can be reduced by the addition of monohydric alcohols, a reaction taking place between the alcohol added and the monomeric starting diisocyanates to be removed. However, this process is attended by the disadvantage that the monohydric alcohol reacts not only with the monomeric starting diisocyanate, but also partially with the modified polyisocyanate, so that its NCO functionality is reduced.

It has now surprisingly been found that through measured addition of water, the reaction between monomeric starting diisocyanate and water, particularly in the case of 2,4-diisocyanatotoluene, takes place more selectively than when a monohydric or dihydric alcohol is added. The result of this (plus the fact that water is a difunctional compound in the context of the isocyanate addition reaction) is that, through the addition of water, the monomer content is reduced far more selectively without any adverse effect on the NCO functionality of the modified polyisocyanates.

SUMMARY OF THE INVENTION

The present invention is directed to a process for the production of urethane- or isocyanurate-modified polyisocyanates based on starting a diisocyanate selected from (i) 2,4-diisocyanatotoluene or mixtures thereof with up to about 35%, based on the mixture, of 2,6-diisocyanatotoluene, (ii) mixtures of the diisocyanates mentioned under (i) with up to 80 NCO equivalent %, based on the mixture, of 1,6-diisocyanatohexane and (iii) 1-isocyanato-3,3,5-trimethyl-5-isocyanatomethyl cyclohexane by reacting the starting diisocyanate with substoichiometric quantities of polyhydric alcohols or trimerizing a portion of the isocyanate groups of the starting diisocyanate, removing sufficient excess, unreacted starting diisocyanate to obtain modified polyisocyanates containing at most 3% by weight, based on solids, of monomeric starting diisocyanate, characterized in that, the content of starting diisocyanate is further reduced by adding at least 10 mole-% water, based on the content of unreacted 2,4-diisocyanatotoluene or 1-isocyanato-3,3,5-trimethyl-5-isocyanatomethyl cyclohexane present, to the modified polyisocyanates.

The present invention is also directed to the low-monomer polyisocyanates obtained by this process and their use as the binder component in one-component or two-component polyurethane lacquers.

DETAILED DESCRIPTION OF THE INVENTION

Starting materials for the process according to the invention are urethane or isocyanurate polyisocyanates based on TDI (2,4-diisocyanatotoluene or a mixture thereof with up to about 35% by weight, based on the mixture, of 2,6-diisocyanatotoluene) or IPDI (1-isocyanato-3,3,5-trimethyl-5-isocyanatomethyl cyclohexane). These polyisocyanates are understood to include the following:

1. Isocyanurate polyisocyanates based on TDI, particularly 2,4-diisocyanatotoluene, or mixtures of TDI with up to 80 NCO equivalent % of 1,6-diisocyanatohexane (HDI). These polyisocyanates, which may be obtained for example in accordance with the teachings of U.S. Pat. No. 3,394,111 or DE-AS No. 1,954,093, generally have a monomeric starting diisocyanate content, based on solids, of 0.2 to 3.0% by weight.

2. Urethane polyisocyanates based on TDI and low molecular weight, polyhydric alcohols having molecular weights in the range from 62 to 250 such as ethylene glycol, the isomeric propane diols, the isomeric butane diols, trimethylolpropane, glycerol, 1,3,6-trihydroxyhexane or mixtures of these polyhydric alcohols. These comparatively low molecular weight urethane polyisocyanates, which are suitable as hardeners for two-component polyurethane lacquers, may be obtained, for example, in accordance with the teachings of DE-PS No. 1,090,196 and are freed from most of the monomers present, for example, by thin-layer distillation. These urethane polyisocyanates are preferably used in the process according to the invention after most of the monomers have been separated, i.e., the polyisocyanates preferably contain 0.3 to 3% by weight, based on the total quantity of isocyanates, of monomeric TDI before the process according to the invention is carried out.

3. Relatively high molecular weight urethane polyisocyanates of the type obtained in a known manner by the reaction of excess quantities of TDI or excess quantities of IPDI with relatively high molecular weight polyhydroxyl compounds having a molecular weight in the range from 250 to about 6000, preferably in the range from about 1000 to 4000. Suitable relatively high molecular weight polyhydroxyl compounds include the polyester polyols or polyether polyols known from polyurethane chemistry which have a hydroxyl functionality of 2 to 4, preferably 2 to 3. These relatively high molecular weight NCO prepolymers may be freed from most of the monomers, optionally by thin-layer distillation, before the process according to the invention is carried out. In general, the monomeric starting diisocyanate content of these NCO prepolymers before the process according to the invention is carried out is from 0.3 to 3% by weight.

The process according to the invention is used for further reducing the content of TDI, particularly 2,4-diisocyanatotoluene, or IPDI in the modified polyisocyanates. In the process according to the invention, the starting polyisocyanates are used either as such or in the form of solutions in suitable inert solvents, particularly in the known inert lacquer solvents. Suitable solvents include ethyl acetate, butyl acetate, methyl ethyl ketone, methyl isobutyl ketone, ethylene glycol monoethyl ether acetate, methoxypropyl acetate, toluene, xylene, mineral spirits or mixtures of these solvents. Hydrophilic solvents of the type mentioned by way of example may also be used as carriers for the water used as modifier.

The question of whether the starting polyisocyanates are used without solvents or in the form of solutions is of course also dependent upon the consistency of the starting polyisocyanates. Starting polyisocyanates which are solids or highly viscous liquids under the process conditions according to the invention will generally be used in dissolved form.

The process according to the invention is preferably carried out at room temperature by stirring the necessary quantity of water into the starting polyisocyanate or its solution. The reaction essential to the invention comprises the substantially selective reaction of monomeric TDI, particularly 2,4-diisocyantotoluene, or IPDI present in the starting polyisocyanate. The water is generally used in a quantity of at least 0.1 mole, preferably 0.2 to 3 moles and more preferably 0.2 to 1.0 mole per mole free TDI or IPDI in accordance with the process according to the invention. At least an equivalent quantity of water, i.e. 0.5 moles water per mole diisocyanate, is necessary for a substantially quantitative removal of the monomeric starting diisocyanates.

The process according to the invention may also be carried out using auxiliaries, particularly catalysts for the isocyanate/water reaction (urea formation). Suitable catalysts include N,N-dimethylbenzylamine, tin octoate or dibutyltin octoate.

The water may be added in pure form or in the form of a solution in a suitable solvent.

The end products of the process according to the invention are valuable binders for one-component or two-component polyurethane lacquers. The two-component polyurethane binders also contain compounds having at least two hydroxyl groups such as polyester, polyether or polyacrylate polyols. In this use according to the invention, the products obtained by the process according to the invention are employed in accordance with the known processes of coating technology.

In the following examples, all percentages are percentages by weight.

EXAMPLES

EXAMPLE 1

In two parallel tests, 0.07% water (molar ratio monomer:water=1:0.32) and 0.14% water (molar ratio=1:0.64) were stirred into an NCO prepolymer having an NCO content of 4.2%, a monomer content of 2.7% and a viscosity at 23° C. of 8400 mPa.s, which had been prepared at 70° C. by the reaction of IPDI with polypropylene glycol, OH value 56, in the presence of 0.1%, based on the weight of the starting materials, of dibutyltin dilaurate. After residence time of 3 days at 23° C., the following characteristic data was determined:

| Molar ratio monomer: $H_2O$ | 1:0 | 1:0.32 | 1:0.64 |
|---|---|---|---|
| Monomer content % | 2.7 | 2.1 | 1.3 |
| NCO content % | 4.2 | 3.9 | 3.5 |
| Viscosity mPa.s/23° C. | 8400 | 10200 | 16000 |

EXAMPLE 2

In two parallel tests, 0.025% water (molar ratio=1:0.23) and 0.05% water (molar ratio=1:0.46) in the form of a 3% solution in ethyl acetate was stirred into an NCO prepolymer having an NCO content of 3.8%, a monomer content of 1.1% and a viscosity at 23° C. of 6600 mPa.s, which had been prepared by the reaction of 2,4-diisocyanatotoluene with polypropylene glycol, OH value 56, at 70° C. in the presence of 0.1% tin octoate as catalyst. After a residence time of 3 days at 23° C., the following characteristic data was determined.

| Molar ratio monomer: $H_2O$ | 1:0 | 1:0.23 | 1:0.46 |
|---|---|---|---|
| Monomer content % | 1.1 | 0.6 | 0.1 |
| NCO content % | 3.8 | 3.6 | 3.4 |
| Viscosity mPa.s/23° C. | 6600 | 5800 | 5300 |

This example clearly demonstrates selectively reducing the content of monomeric 2,4-diisocyanatotoluene in the modified isocyanate.

EXAMPLE 3

0.09% water (molar ratio TDI:water=1:2.9) in the form of a 3% solution in ethyl acetate was stirred into a polyisocyanate adduct (NCO content 12.8%, monomer content 0.3%, viscosity at 23° C. 1600 mPa.s) in the form of a 75% solution in ethyl acetate which had been prepared by the reaction of an isomer mixture of 65% 2,4-diisocyanatotoluene and 35% 2,6-diisocyanatotoluene with trimethylolpropane and then freed from excess monomer by thin-layer distillation. After storage at 23° C., the following characteristic data was determined as a function of time (all figures apply to the solution.).

| Residence time in days | 0 | 7 | 14 | 28 |
|---|---|---|---|---|
| Monomer content % | 0.30 | 0.24 | 0.17 | 0.14 |
| NCO Content % | 12.6 | 12.2 | 12.0 | 12.0 |
| Viscosity mPa.s/23° C. | 835 | 1340 | 1350 | 1530 |

Example 4

This example demonstrates that the use of water to reduce the monomer content is more effective than the use of alcoholic modifying agents.

In three parallel tests, 0.025% water (molar ratio=1:0.23), 0.086% ethylene glycol (molar ratio=1:0.23) and 0.17% isopropanol (molar ratio=1:0.46) were stirred into the NCO prepolymer of Example 2 (monomer content=1.1%). The following characteristic data was determined after a residence time of 3 days at 23° C.

| Equivalent quantities | Ethylene glycol | Isopropanol | Water |
|---|---|---|---|
| Monomer content % | 0.9 | 0.9 | 0.6 |
| NCO content % | 3.6 | 3.6 | 3.6 |
| Viscosity mPa.s/23° C. | 7200 | 6700 | 7700 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a urethane- or isocyanurate-modified polyisocyanate based on a starting diisocyanate comprising a member selected from the group consisting of (i) 2,4-diisocyanatotolune or mixtures thereof with up to about 35%, based on the mixture, of 2,6-diisocyanatotoluene, (ii) mixtures of (i) with up to about 80 NCO equivalent % based on the mixture of 1,6-diisocyanatohexane and (iii) 1-isocyanato-3,3,5-trimethyl-5-isocyanatomethylcyclohexane which comprises
(a) reacting said starting diisocyanate with a substoichiometric quantity of a polyhydric alcohol or trimerizing a portion of the isocyanate groups of said starting diisocyanate,
(b) removing sufficient excess, unreacted starting diisocyanate to obtain a modified polyisocyanate containing at most 3% by weight, based on solids, of said starting diisocyanate and
(c) further reducing the content of starting diisocyanate by adding at least 10 mole-% of water, based on the content of unreacted 2,4-diisocyanatotoluene or 1-isocyanato-3,3,5-trimethyl-5-isocyanatomethyl cyclohexane, to the modified polyisocyanate.

2. The process of claim 1 wherein said starting diisocyanate is 2,4-diisocyanatotoluene.

3. A urethane- or isocyanurate-modified polyisocyanate based on a starting diisocyanate comprising a member selected from the group consisting of (i) 2,4-diisocyanatotolune or mixtures thereof with up to about 35%, based on the mixture, of 2,6-diisocyanatotoluene, (ii) mixtures of (i) with up to about 80 NCO equivalent % based on the mixture of 1,6-diisocyanatohexane and (iii) 1-isocyanato-3,3,5-trimethyl-5-isocyanatomethylcyclohexane which is prepared by a process comprising
(a) reacting said starting diisocyanate with a substoichiometric quantity of a polyhydric alcohol or trimerizing a portion of the isocyanate groups of said starting diisocyanate,
(b) removing sufficient excess, unreacted starting diisocyanate to obtain a modified polyisocyanate containing at most 3% by weight, based on solids, of said starting diisocyanate and
(c) further reducing the content of starting diisocyanates by adding at least 10 mole-% of water, based on the content of unreacted 2,4-diisocyanatotoluene or 1-isocyanato-3,3,5-trimethyl-5-isocyanatomethyl cyclohexane, to the modified polyisocyanate.

4. The polyisocyanate of claim 3 wherein said starting diisocyanate is 2,4-diisocyanatotoluene.

5. A two-component polyurethane lacquer which comprises the modified polyisocyanate of claim 3 and a compound containing at least two hydroxyl groups.

* * * * *